United States Patent Office 2,835,600
Patented May 20, 1958

2,835,600

COLORED CRAYONS FOR DECORATING CERAMIC WARE

Rosa Zgraggen, Dietikon, near Zurich, Switzerland

No Drawing. Application June 24, 1954
Serial No. 439,151

6 Claims. (Cl. 106—19)

The painting of ceramic objects made of porcelain or earthenware has been widely practised as a craft for centuries. Colored porcelain and earthenware are articles of daily use; if the design has been executed by an artist, they are considered as objects of artistic value. A survey of the literature has shown that all paints hitherto used for this purpose were employed exclusively in the liquid state, i. e. they were suspended or emulsified in a liquid vehicle and applied in this form by means of a brush to the glazed ware before firing the same. Experience has shown, however, that whereas a schooled craftsman is able to paint the most delicate designs on porcelain or earthenware with these liquid paints, persons lacking in practise or not sufficiently acquainted with the technique are beset by difficulties and are hardly able to obtain satisfying results. There is thus a real need for simpler tools with which to paint or decorate ceramics.

A primary object of the present invention is to satisfy this need. This object is realized by a new type of colored crayons for decorating ceramic ware. This new type of crayon can be prepared according to the present invention, briefly stated, by mixing suitable metal compounds serving as ceramic pigments—which after firing of the decorated ceramic ware remain as a colored layer on the surface of the latter—consisting of salts or oxides of heavy metals, such as chromium, cobalt, copper, antimony, iron, tin and the like, with suitable inorganic carriers, such as clay or certain clay minerals (aluminum oxide, aluminum silicates, etc.), kaolin, kieselguhr, white bole, silica, zince oxide, metastannic acid, calcium phosphate and the like, filtering the mixture if necessary or desired, making it into a paste with suitable liquid or liquefiable inorganic or organic binders, such as water, glycerine, starch gum, tragacanth jelly, glucose solutions, synthetic resin emulsions, gum arabic, casein solutions and the like, and pressing the mass into thin leads which are air-dried and fired at a temperature of 400–1000° C. The crayons obtained in this way are only slightly colored and do not show their definite shade. After drawing with them on ceramic ware, there remains a layer consisting of salts or oxides of the heavy metals mentioned above, and the carrier substance. The desired color results during the firing process undergone by the ceramic ware and is determined by the relation between the salts or oxides of the heavy metals and the carrier substances.

This invention has entirely transformed the technique of decorating ceramic wares, since a simple drawing process is able to replace the application of liquid paints with a brush, as practised hitherto. The new method requires a minimum degree of technical experience and craftsmanship and can therefore be applied by unskilled persons, including children. The invention is of great value since large parts of the population who derive pleasure from painting ceramic ware but hitherto had to renounce this art in view of the high standard of craftsmanship required by the use of liquid paints, are now in a position to produce attractive, individual and also artistically valuable ceramic objects with the colored leads prepared according to the process described herein. The trained craftsman and artist, however, equally derive an advantage from the new invention, as it puts them in a position to obtain entirely new effects of design on pottery and other ceramic ware; the new invention thus greatly augments the scope and possibilities of variation of this art.

The process for the preparation of colored crayons according to the present invention consists mainly in mixing certain metal compounds, usually salts or oxides of heavy metals (e. g. chromium, cobalt, copper, antimony, iron, tin, cadmium, beryllium and vanadium), such as antimony oxide, antimonate of lead, beryllium oxide, cadmium sulfide, chromium oxide, cobalt oxide, cobalt carbonate, iron oxide, lead nitrate, manganese oxide, potassium dichromate, potassium chromate, stannic oxide and the like, thoroughly with suitable fusible non-pigmented ceramic adherent carriers, such as clay or certain clay minerals (aluminum oxide, aluminum silicates, etc.), kaolin, kieselguhr, white bole, silica, zinc oxide, metastannic acid, calcium phosphate and the like, making them into a paste with suitable liquid or liquefiable binders, such as water, glycerin, starch gum, tragacanth jelly, glucose solutions, gum arabic, synthetic resin emulsions, casein solutions and the like, and forming or pressing leads which after drying and firing at a temperature between 400 and 1000° C., give the finished crayons which after being applied to the ceramic ware, produce the desired shade and intensity of color when the latter has undergone the firing process. The crayons prepared according to this process are the first products for "painting" ceramic objects, which are not based upon the known method of applying liquid coloring materials with a brush.

The colored crayons prepared according to the process described above can be employed for drawing colored designs on ceramic objects, such as pottery and the like, by the ordinary drawing technique. The objects decorated in this way have the aspect of porcelain, are of unlimited durability, and have the advantage that they can be produced by unskilled persons.

The following examples illustrate the process of preparation of the ceramic crayons mentioned above. The weight proportions of the different constituents mentioned therein are not to be regarded as the only possible ones. On the contrary, it lies in the nature of the process described that certain changes in the relation of the constituents are possible and even necessary to obtain variations in the shade and intensity of the colors.

The following examples give red, yellow, blue, green and black crayons. On combining the pigments of the different examples in various ways, a wide range of pastel shades may also be obtained.

Throughout the examples, parts by weight are designated as "parts." Percentages are also by weight.

*Example 1.—Ceramic crayons, red color*

100 parts of calcined stannic oxide, 50 parts of calcium carbonate and 36 parts of powdered quartz are intimately mixed. A hot saturated aqueous solution of 6 parts of potassium chromate and 8 parts of borax is added and the mixture homogenized in an homogenizing apparatus, passed through a roller mill, air-dried, ground mechanically to a fine powder, and heated in an air current to a high temperature.

8 parts of the resultant mass, 2 parts of kieselguhr and 1 part of 10% gum arabic are worked into a paste. Addition of a certain amount of water may be necessary according to the consistency of the carriers, such as kieselguhr, powdered quartz, calcium carbonate and the like, which are not always obtainable in the same quality. It is essential that the paste prepared according to the process described above be absolutely homogeneous (homogeneity may be obtained by treatment in a roller mill) and can be pressed in suitable pressing forms to thin leads which measure approximately 4 mm. in diameter.

The leads thus obtained are left in the press for several days until they are hardened through evaporation of water, and are then heated in a drying box to temperatures between 400° and 1000° C. In this way, red crayons are obtained which can be used for drawing on ceramics and which upon application release the pigment evenly without damaging the surface of the ceramic objects.

*Example 2.—Ceramic crayons, yellow color*

73 parts of lead nitrate, 33 parts of antimony oxide, 12 parts of aluminum oxide and 100 parts of sodium chloride are intimately mixed, homogenized, passed through a roller mill, air-dried, finely ground and washed.

10 parts of the resultant mass, 3 parts of calcium stannate and 1 part of 10% dextrin are worked up into a homogeneous paste, e. g. in a roller mill, after which the paste is pressed in suitable pressing forms to thin leads which measure approximately 4 mm. in diameter.

The leads thus obtained are left in the press for several days until they are hardened through evaporation of water, and are then heated in a drying box to temperatures between 400° and 1000° C. In this way, yellow crayons are obtained which may be used for drawing on ceramics and which upon application release the pigment evenly without damaging the surface of the ceramic objects.

*Example 3.—Ceramic crayons, blue color*

30 parts of cobalt oxide, 20 parts of powdered quartz and 30 parts of earthenware glazing (e. g. sodium silicate) are intimately mixed, calcined by heating to a temperature of approximately 2000° C., left to cool, and mechanically ground to a fine powder.

15 parts of the resultant mass, 3 parts of feldspar and 1 part of 20% glycerin are made into homogeneous paste, and then pressed in suitable pressing forms to thin leads which measure approximately 4 mm. in diameter.

The leads thus obtained are left in the press for several days until they are hardened through evaporation of water, and are then heated in a drying box to temperatures between 400° and 1000° C. In this way, blue crayons are obtained which can be used for drawing on ceramics and which upon application release the pigment evenly without damaging the surface of the ceramic objects.

*Example 4.—Ceramic crayons, blue color*

100 parts of cobalt carbonate, 50 parts of aluminum oxide hydrate and 20 parts of stannic oxide are intimately mixed, calcined by heating to a temperature of approximately 2000° C., left to cool, and ground mechanically to a fine consistency.

15 parts of the resultant mixture, 3 parts of kaolin and 1.5 parts of a solution of 800 grams of glucose in 200 cc. of water are made into a homogeneous paste, and then pressed in suitable pressing forms to thin leads which measure approximately 4 mm. in diameter.

The leads thus obtained are left in the press for several days until they are hardened through evaporation of water, and are then heated in a drying box to temperatures between 400° and 1000° C. In this way, blue crayons are obtained which can be used for drawing on ceramics and which upon application release the pigment evenly without damaging the surface of the ceramic objects.

*Example 5.—Ceramic crayons, green color*

20 parts of potassium dichromate, 30 parts of powdered quartz, 10 parts of borax, 10 parts of calcite, 20 parts of calcined gypsum and 10 parts of stannic oxide are intimately mixed, left to cool, ground mechanically to a fine powder and thoroughly washed.

20 parts of the resultant mass, 10 parts of finely ground chamotte and 2 parts of an aqueous 4% animal glue solution are made into a homogeneous paste, and then pressed in suitable pressing forms to thin leads which measure approximately 4 mm. in diameter.

The leads thus obtained are left in the press for several days until they are hardened through evaporation of water, and are then heated in a drying box to temperatures between 400° and 1000° C. In this way, green crayons are obtained which can be used for drawing on ceramics and which upon application release the pigment evenly without damaging the surface of the ceramic objects.

*Example 6.—Ceramic crayons, black color*

30 parts of iron oxide, 30 parts of chromium oxide, 17 parts of manganese dioxide, 17 parts of cobalt oxide and 10 parts of borax are intimately mixed, left to cool, ground mechanically to a fine powder, and washed.

20 parts of the resultant mixture, 5 parts of infusorial earth and 0.25 part of a solution of 1 part of casein in 1.5 parts of conc. ammonia diluted with 4 parts of water, are made into a homogeneous paste, and then pressed in suitable pressing forms to thin leads which measure approximately 4 mm. in diameter.

The leads thus obtained are left in the press for several days until they are hardened through evaporation of water, and are then heated in a drying box to temperatures between 400° and 1000° C. In this way, black crayons are obtained which can be used for drawing on ceramics and which upon application release the pigment evenly without damaging the surface of the ceramic objects.

The colored crayons obtained according to the process described herein are employed, as mentioned above, for drawing on ceramic objects. When the decoration is terminated, these objects are glazed and fired in the kiln at temperatures between 750 and 1300° C. The firing imparts to their surface a hard, porcelain-like consistency.

The glazings employed for this purpose are those generally known in the ceramic industry and usually consist in suspensions or solutions of boron, zinc glass, alkali silicate or alkali aluminum silicate compounds in water. The ceramic objects destined for glazing are dipped in these solutions or suspensions and afterwards fired in the kiln at temperatures between 750 and 1300° C.

While a preferred form of crayon takes the form of a "lead" having a diameter of 4 mm., crayons of various sizes and configurations may be made according to the present invention.

Having thus disclosed the invention, what is claimed is:

1. A latent-colored crayon for decorating the ceramic surface of ceramic ware and being adherent in layer form to said surface upon application thereto prior to the firing of the ceramic ware, the definitive color of said layer being developed upon subsequent firing of said ware, said crayon being prepared by homogeneously admixing 100 parts by weight of calcined stannic oxide, 50 parts by weight of calcium carbonate, 36 parts by weight of powdered quartz, 6 parts by weight of potassium chromate and 8 parts by weight of borax, converting 8 parts by weight of the resultant mass and 2 parts by weight of infusorial earth into paste form with 1 part by weight of 10% gum arabic, pressing the so-obtained paste into the form of a crayon, and heating said crayon at a temperature between 400° and 1000° C., whereby upon directly applying said crayon to said ceramic surface a layer of pigment-forming material and carrier is deposited on said surface, which layer upon firing of the ceramic ware develops a red-colored pigment, whereby decoration of the surface of ceramic ware may be accomplished by marking with said crayon and without the necessity of using paint.

2. A latent-colored crayon for decorating the ceramic surface of ceramic ware and being adherent in layer form to said surface upon application thereto prior to the firing of the ceramic ware, the definitive color of said layer being developed upon subsequent firing of said ware, said crayon being prepared by homogeneously admixing 73 parts by weight of lead nitrate, 33 parts by weight of antimony oxide, 12 parts by weight of aluminum oxide and 100 parts by weight of sodium chloride, forming a paste of 10 parts by weight of the resultant admixture and 3 parts by weight of calcium stannate with 1 part by weight of 10% dextrin, pressing the resultant paste into the form of a crayon and heating said crayon at a temperature between 400° and 1000° C., whereby upon directly applying said crayon to said ceramic surface a layer of pigment-forming material and carrier is deposited on said surface, which layer upon firing of the ceramic ware develops yellow colored pigment, whereby decoration of the surface of ceramic ware may be accomplished by marking with said crayon and without the necessity of using paint.

3. A latent-colored crayon for decorating the ceramic surface of ceramic ware and being adherent in layer form to said surface upon application thereto prior to the firing of the ceramic ware, the definitive color of said layer being developed upon subsequent firing of said ware, said crayon being prepared by homogeneously admixing 30 parts by weight of cobalt oxide, 20 parts by weight of silica and 30 parts by weight of sodium silicate, converting 15 parts by weight of the resultant mass and 3 parts by weight of feldspar into a paste with the aid of 1 part by weight of 20% glycerine, pressing the resultant paste into the form of a crayon and heating said crayon at a temperature between 400° and 1000° C., whereby upon directly applying said crayon to said ceramic surface a layer of pigment-forming material and carrier is deposited on said surface, which layer upon firing of the ceramic ware develops blue colored pigment, whereby decoration of the surface of ceramic ware may be accomplished by marking with said crayon and without the necessity of using paint.

4. A latent-colored crayon for decorating the ceramic surface of ceramic ware and being adherent in layer form to said surface upon application thereto prior to the firing of the ceramic ware, the definitive color of said layer being developed upon subsequent firing of said ware, said crayon being prepared by homogeneously admixing 20 parts by weight of potassium dichromate, 30 parts by weight of powdered quartz, 10 parts by weight of borax, 10 parts by weight of calcite, 20 parts by weight of calcined gypsum and 10 parts by weight of stannic oxide, forming a paste of 20 parts by weight of the resultant admixture and 10 parts by weight of ground chamotte with the aid of 2 parts by weight of aqueous 4% animal glue solution, pressing the resultant paste into the form of a crayon and heating said crayon at a temperature between 400° and 1000° C., whereby upon directly applying said crayon to said ceramic surface a layer of pigment-forming material and carrier is deposited on said surface, which layer upon firing of the ceramic ware develops green colored pigment, whereby decoration of the surface of ceramic ware may be accomplished by marking with said crayon and without the necessity of using paint.

5. A latent-colored crayon for decorating the ceramic surface of ceramic ware and being adherent in layer form to said surface upon application thereto prior to the firing of the ceramic ware, the definitive color of said layer being developed upon subsequent firing of said ware, said crayon being prepared by homogeneously admixing 30 parts by weight of iron oxide, 30 parts by weight of chromium oxide, 17 parts by weight of manganese dioxide, 17 parts by weight of cobalt oxide and 10 parts by weight of borax, forming a paste of 20 parts by weight of the resultant admixture and 5 parts by weight of infusorial earth with 0.25 part by weight of a solution of 1 part by weight of casein in 1.5 parts by weight of concentrated ammonia diluted with 4 parts by weight of water, pressing the resultant paste into the form of a crayon and heating said crayon at a temperature between 400° and 1000° C., whereby upon directly applying said crayon to said ceramic surface a layer of pigment-forming material and carrier is deposited on said surface, which layer upon firing of the ceramic ware develops black colored pigment, whereby decoration of the surface of ceramic ware may be accomplished by marking with said crayon and without the necessity of using paint.

6. A latent-colored crayon for decorating the ceramic surface of ceramic ware and being adherent in layer form to said surface upon application thereto prior to the firing of the ceramic ware, the definitive color of said layer being developed upon subsequent firing of said ware, said crayon being prepared by homogeneously admixing 100 parts by weight of cobalt carbonate, 50 parts by weight of aluminum oxide hydrate and 20 parts by weight of stannic oxide, converting 15 parts by weight of the resultant mass and 3 parts by weight of kaolin into a paste with the aid of 1.5 parts by weight of a solution of 800 grams of glucose in 200 cubic centimeters of water, pressing the resultant paste into the form of a crayon and heating said crayon at a temperature between 400° and 1000° C., whereby upon directly applying said crayon to said ceramic surface a layer of pigment-forming material and carrier is deposited on said surface, which layer upon firing of the ceramic ware develops blue colored pigment, whereby decoration of the surface of ceramic ware may be accomplished by marking with said crayon and without the necessity of using paint.

References Cited in the file of this patent

UNITED STATES PATENTS

| | | |
|---|---|---|
| 45,518 | Pierce | Dec. 20, 1864 |
| 117,084 | Lanstrom | July 18, 1871 |
| 196,054 | Swasey | Oct. 9, 1877 |
| 206,889 | Madden | Aug. 13, 1878 |
| 217,713 | Steward | July 22, 1879 |
| 316,373 | Kraus | Apr. 21, 1885 |
| 316,374 | Kraus | Apr. 21, 1885 |
| 1,256,042 | Rosevear | Feb. 12, 1918 |
| 1,970,603 | Grossman | Aug. 21, 1934 |
| 2,013,584 | Schwanhausser | Sept. 3, 1935 |
| 2,041,740 | Beckman | May 26, 1936 |

FOREIGN PATENTS

| | | |
|---|---|---|
| 9,149 | Great Britain | of 1884 |

OTHER REFERENCES

Furnival: "Leadless Decorative Tiles, Fajence and Mosaic" (pp. 182–183 and 705–723).

Smith et al.: J. Amer. Ceramic Soc., vol. 15 p. 630–631 (1932).